US005202166A

United States Patent [19]

Crompton et al.

[11] Patent Number: 5,202,166

[45] Date of Patent: Apr. 13, 1993

[54] COMPOSITE STRUCTURE

[76] Inventors: Todd F. Crompton, 613 2nd St., Ct., Sherrard, Ill. 61281; Steven P. Brutsche, 2710 38th St., Rock Island, Ill. 61201

[21] Appl. No.: 578,168

[22] Filed: Sep. 6, 1990

[51] Int. Cl.[5] .................. B32B 3/14

[52] U.S. Cl. .................. 428/33; 273/153 R; 404/41

[58] Field of Search .................. 428/33, 48, 51, 53; 273/153 R, 156, 157 R; 404/41, 42; 52/311

[56] References Cited

U.S. PATENT DOCUMENTS

| | | | |
|---|---|---|---|
| 708,470 | 9/1902 | Flood | 404/42 X |
| 750,779 | 1/1904 | Nilsson | 52/311 |
| 779,536 | 1/1905 | Dickey et al. | 52/311 |
| 3,174,893 | 3/1965 | Church et al. | 52/311 |
| 4,083,123 | 4/1978 | Livermore | 273/157 R X |
| 4,612,220 | 9/1986 | Baxter | 428/33 |
| 4,850,739 | 7/1989 | Gargollo | 404/41 |
| 5,022,655 | 6/1991 | Meyer | 273/157 R |

FOREIGN PATENT DOCUMENTS

| | | | |
|---|---|---|---|
| 1251327 | 10/1971 | United Kingdom | 428/33 |

*Primary Examiner*—Henry F. Epstein

[57] ABSTRACT

A composite structure finding principal utility in the formation of walls, floors, patios and the like, for example. The structure is made up of a coplanar assembly of slab-like flat-faced elements provided with knobs and sockets that are congruent with each other as well as being congruent throughout the total structure so as to provide positive interlocks among the elements and thus eliminating the need for adhesive and like binders. The elements may be of molded concrete and relatively light weight so as to facilitate handling on the job by the ordinary artisan in the building of a patio, for example, in the elements are coplanar on a bed of sand, etc. The elements are furnished in several groups in which each group contains several identical elements. In addition to the knob-socket feature, the elements have perimetrical outlines or configurations such that side-by-side elements abuttingly match each other as to contour.

17 Claims, 4 Drawing Sheets

Fig. 1
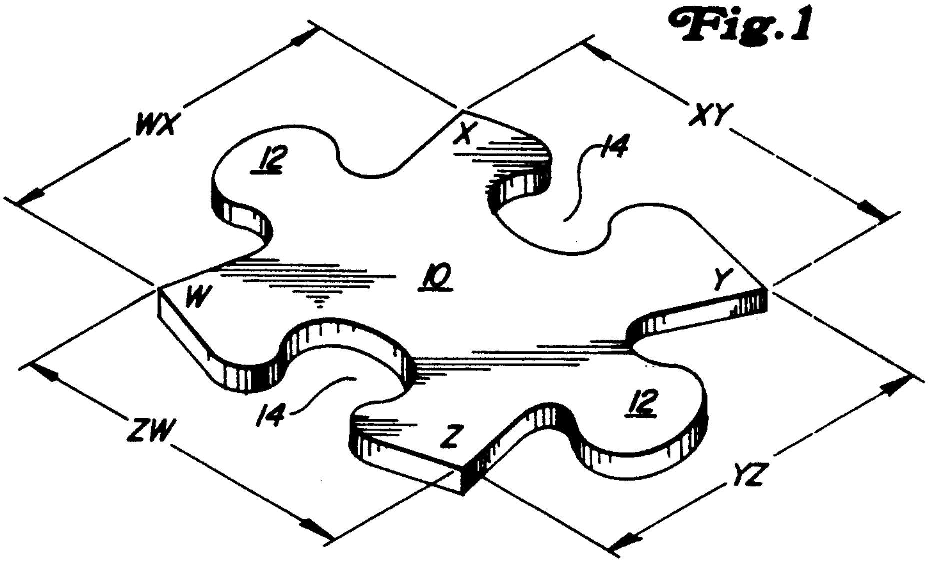
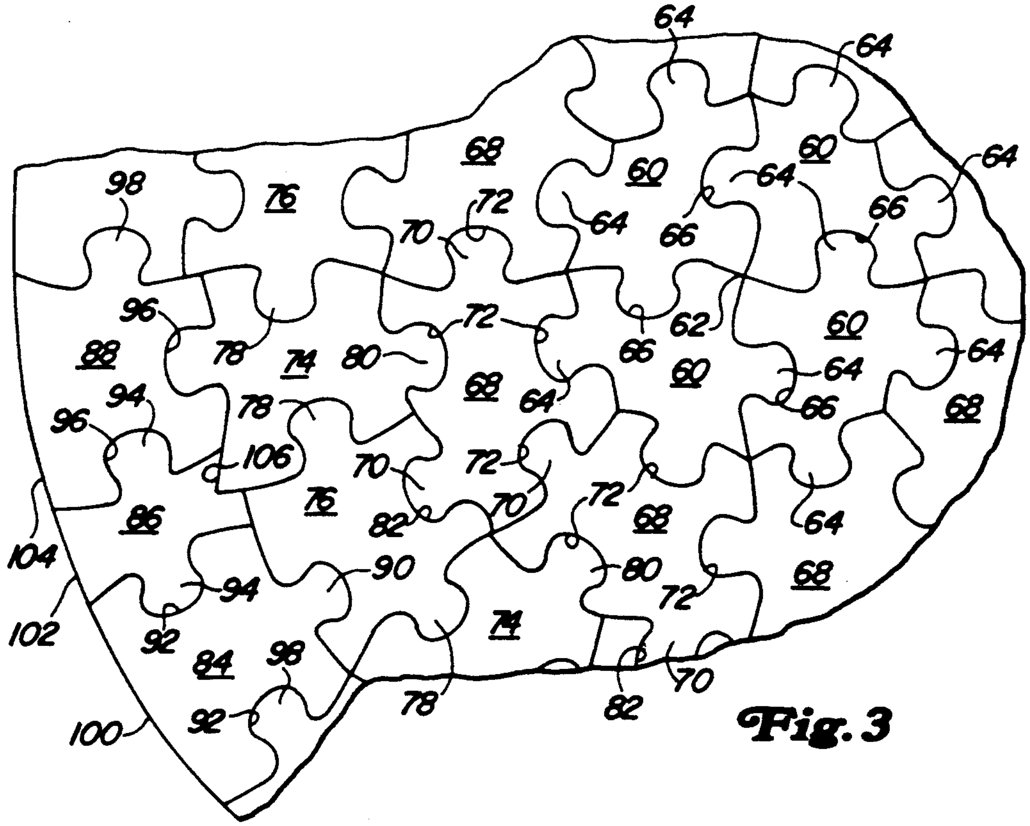
Fig. 3

COMPOSITE STRUCTURE

BACKGROUND AND SUMMARY OF THE INVENTION

It is of course known to provide walls, floors and the like of assembled components of various sizes and shapes, usually embedded in some form of adhesive; e.g., mosaics tesselated forms and the like. Also, floors, patios, etc. are known to be constructed of oblongs, squares, hexagons, etc. Apart from structures cemented together or retained by outer boundaries, the elements of prior patterns suffer mainly from lateral separation because of the lack of element-to-element interlocks.

According to the present invention, these and other problems are eliminated by a simple low-cost arrangement of interlocking elements of which many are identical and all of which have knobs and sockets that positively interfit and interlock element-to-element throughout the pattern. The elements may be conveniently formed in any suitable manner, as by molding of concrete, for example, particularly when the elements are intended for the construction of a patio or other area expected to bear fairly heavy or frequent outdoor traffic.

It is a further feature of the invention to so form the elements that certain thereof may be flipped over from side to side so as to avoid unnecessary "rights" and "lefts". Each element in what may be termed a basic group made up of the largest number of elements, may be so configured that part of its perimetrical outline includes the four corners of an imaginary square, whereby the sides of the square, or distances from corner to corner, are equal, thus facilitating assembly as well as packaging for sale and distribution. Since so many of the elements may be identical, the numbers of molds are markedly reduced, further contributing to the simplicity and economy of manufacture, distribution and use.

Further features and objects will become apparent as the invention is disclosed in detail hereinafter.

BRIEF DESCRIPTION OF THE DRAWINGS

FIG. 1 is a perspective of one of the basic elements.

FIG. 3 is a partial view showing the use of different elements in the formation of a quarter-circle pattern from which a full-circle pattern may be easily visualized.

FIG. 6 shows, in perspective and on a reduced scale, an arrangement in which a patio, walk, etc. is interlocked with a retaining wall, curb or the like.

DETAILED DESCRIPTION OF A PREFERRED EMBODIMENT OF THE INVENTION

Figure 2:
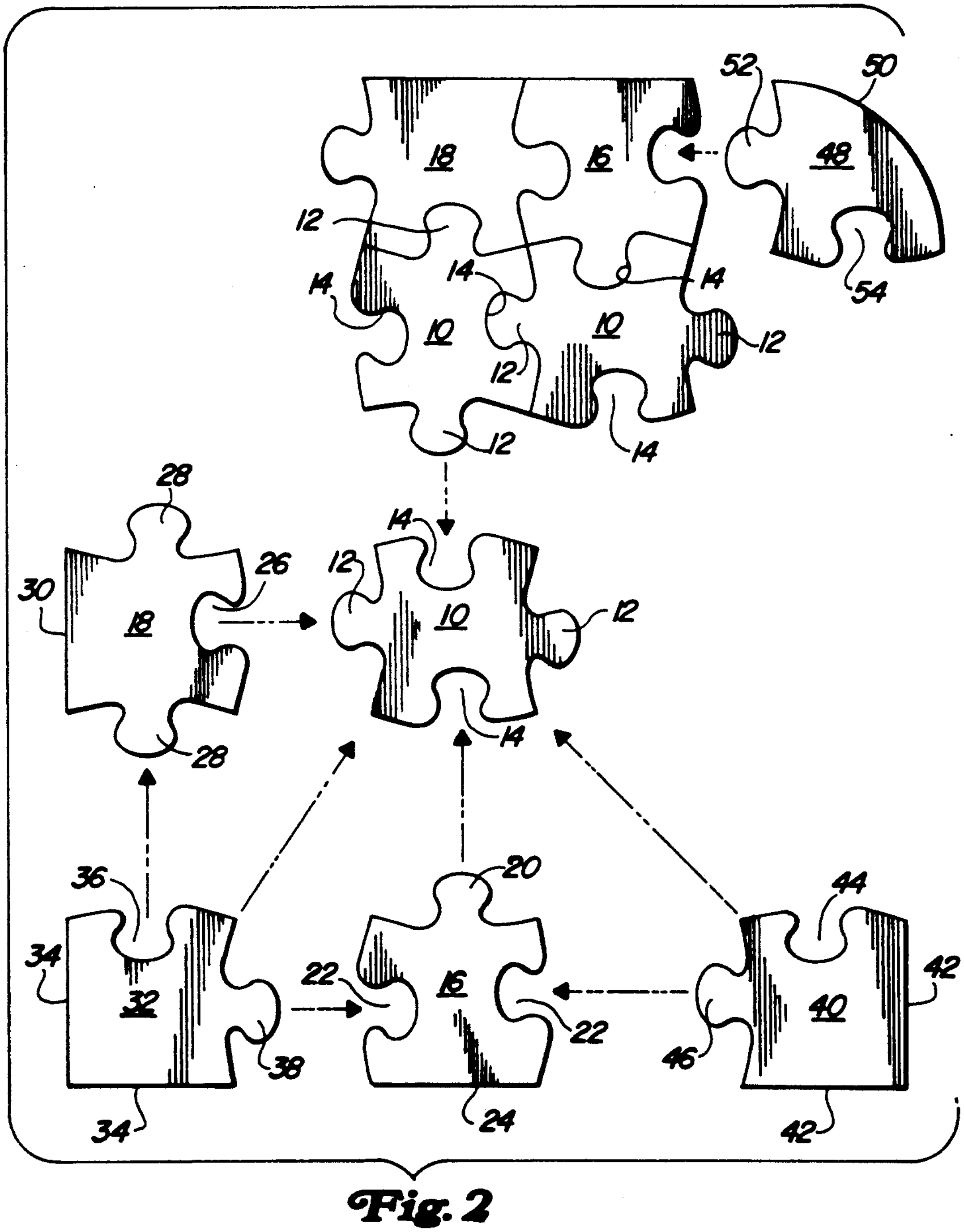
FIG. 2 is an exploded view showing the use of several FIG. 1 elements in conjunction with additional elements in the formation of a square or rectangular pattern.

Reference is had to FIG. 1 as showing an element 10 which is one of several like elements used in the major part of the formation of a square or rectangular pattern or as part of a pattern including a portion included in a square or a rectangle. The element 10 has a perimetrical outline generally in the form of the letter "H" with the crossbar extended at opposite sides. The crossbar extensions here provide a pair of lobes or knobs 12 which are identical to each other as well as being identical to or congruent with a pair of pockets or sockets 14. The element selected for purposes of disclosure is preferably of one-piece relatively rigid or solid nature and, where molded of concrete, may have dimensions of 24"×16" and a thickness of 3" to 4 or more inches and a weight in the order of ninety pounds. These characteristics, as well as other dimensional, weight and like details are but representative and are not intended in any manner to limit the broader aspects of the invention. For example, and again not by way of limitation, the present disclosure is in terms of the structure as a patio but when used as a floor, wall, panel, etc., other materials, sizes and weights may be involved.

The element 10 is based on an imaginary square and thus has four corners W, X, Y and Z. Consequently, the sides WX, XY, YZ and ZW are equal. The purpose of this geometry will become apparent as the description proceeds with assembly of the elements 10 with neighboring elements. It will be seen from FIG. 1 that one lobe or knob 12 projects from the body of the element 10 midway between the corners W and X, or at one side of the square; the opposite knob projects from the element body midway between the corners YZ, or at the opposite side of the square. Similarly, the recesses or sockets 14 lie in alinement across the square, being let in, respectively, from the sides XY and WZ.

In FIG. 2, an element 10 is shown surrounded by further elements, some of which will be recognized as identical to each other and to the element just described. Thus, the components for a square pattern, for example, will include a group of several elements 10, by far the greatest number, all of which will make up the interior of the pattern. It is to be noted that elements 10 can be and are turned alternately by ninety degrees so as to make up the greater proportion of the pattern. Bordering elements will be needed to provide the pattern with straight edges, along with corner elements of at least two types. In the present case, there are two types of border elements 16 and 18. The element 16 has one knob 20, a pair of opposed sockets 22 and a straight edge 24. If the element 10 at the center of FIG. 1 is assumed to be the next to the lowermost element in the pattern, it is seen that the knob 20 on the element 16 fits and interlocks with the lower socket 14 in the next above element 10. Making a similar assumption with regard the "central" element 10 as to the next to last leftward element, it follows that the side element 18 interlocks with the element 10 because it has a socket 26 and two opposed knobs 28 as well as a straight edge 30. In assembly, the socket 26 receives the knob 12 on the element 10 (note arrow) and the knobs 28 receive sockets 22 in neighboring elements 16 (not shown at the left side of the view, but easily assumed). The lower most knob 28 on the element 18 (or one like it) interlocks with a "square" corner element 32 which has perpendicular straight edges 34, a socket 36 and a knob 38. The knob 38 fits the socket 22 in an element 16 and the socket 36 fits the knob 28 in an element 18 (again note arrows).

At the opposite corner of the view (FIG. 2) is another corner element 40 which is an element 32 flipped over and which has perpendicular edges 42, a socket 44 and a knob 46. The interlock will be clear without further detailed description. It will be noted that the elements 16 and 18 are virtual "repeats" of the elements 10 except that the straight edge 24 on the element 16 replaces a knob and the straight edge 30 on the element 18 replaces a socket. Also, the "basic square" format seen at WXYZ in FIG. 1 will be recognized in the elements 16 and 18. Likewise, the "square" will be visualized in the corner elements 32 and 40, all of which is part of the configuration or perimetrical outline of the elements which, in addition to the knobs and sockets, enables the elements to match each other edgewise or in abutting fashion. An alternate type of corner element 48 may be used to give the square or rectangular pattern rounded corners by way of a ninety-degree curved edge 50 and a knob 52 and a socket 54. The configuration of the edge 50 may of course be otherwise. The interlock of the element 48 with the neighboring elements should be clear without further detail.

FIG. 3 shows enough of the interior pattern of a structure which will eventuate into a circular structure. For this purpose, the elements will adopt a basic geometry having reference to radii from a common center. In this case, there are four interior or base area elements 60 configured as shown and grouped and matched about a center 62. Each element 60 has three knobs 64 and one socket 66 and their perimetrical outlines are further such that they match smoothly with each other as well as with neighboring elements 68 which are arranged in a circular group or ring about the elements 60. Each element 68 has two knobs 70 and three sockets 72 which of course follow the pattern of knob-to-socket configuration common to the elements as already described. As seen in FIG. 3, some of the knobs 70 interlock with recesses 72 in neighboring elements 68 and some interlock with knobs 64 on the central elements 60. Again, the outlines of the elements 68 are the same and match with each other as well as with the elements 60 and other elements about to be described.

The ring or circular group of elements 68 is surrounded by a third group of elements arranged likewise in a ring made up of elements 74 and 76, the former comprising one set and the latter a second set. The elements 74 and 76 differ from each other because of the circular pattern but they have in common the knob-to-socket relation to each other, at 78, as well as knobs 80 on the elements 74 which fit the sockets 72 of the elements 68 and also sockets 82 on the elements 76 which interlock with certain of the knobs 70 on the elements 68. A further group or ring of elements borders on and surrounds the ring of elements 74 and 76, here comprising three types of elements 84, 86 and 88, again different from each other because of the circle pattern. Each element 84 has a knob 90 and a pair of sockets 92; each element 86 has only a pair of knobs 94; and each element 88 has two sockets 96 and one knob 98. These all cooperate in interlocking fashion among each other and with the elements 74 and 76 as will be clear from the drawing. The elements 84, 86 and 88 have arcuate outer edges 100, 102 and 104, respectively, to provide the circular edge of the pattern. Each element 86 is notched at 106 to accommodate the respective neighboring element 74. Again, the perimetrical outlines of the elements are such as to closely match each other and contribute to the unitary structure.

Figure 4:
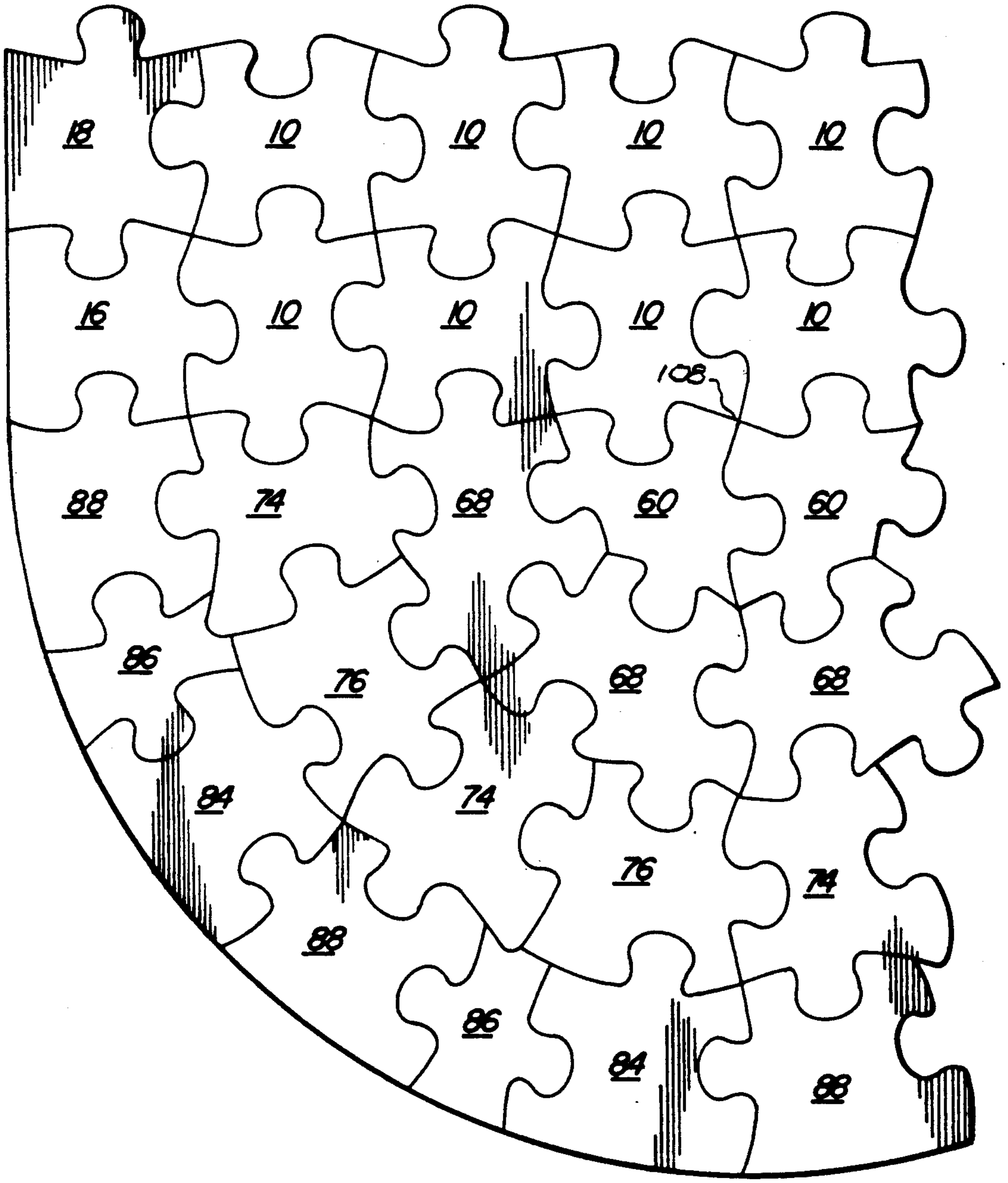
FIG. 4 is a view showing in part the combination of parts of FIGS. 2 and 3 in the forming of a pattern having straight sides and semicircular ends.

FIG. 4 is a fragmentary view showing part of one end of a structure made up mainly of elements 10 (Compare FIG. 2) but having a semi-circular end (compare FIG. 3). The semi-circular end starts with a pair of neighboring elements 10 at a center 108 which is a counterpart of the center 62 in FIG. 3. In FIG. 4, a semicircular group of elements 68 interlocks with and borders on the elements 60; a further semicircular group of elements 74 and 76 borders on the elements 68 and so on, which is deemed to be clear without further detailed description and without numbering the several interlocking knobs and sockets. The matching outlines of course will also be apparent from the drawing.

Figure 5:
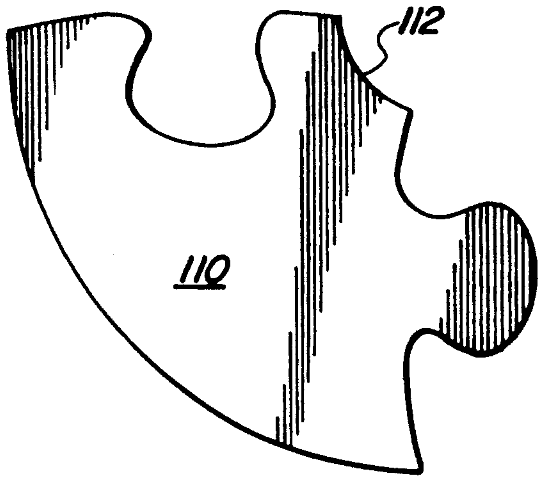
FIG. 5 is a view of an element having a notch or cut-out for accommodating additional structure, such as a tree, pole, etc.

FIG. 5 is a view of a modified rounded corner element 110 having a notch or cut-out 112 for accommodating some structure apart from the overall pattern; e.g., a tree, post, etc. A like configuration could be provided in any of the elements and the notch could be a through opening or the like.

Figure 6:
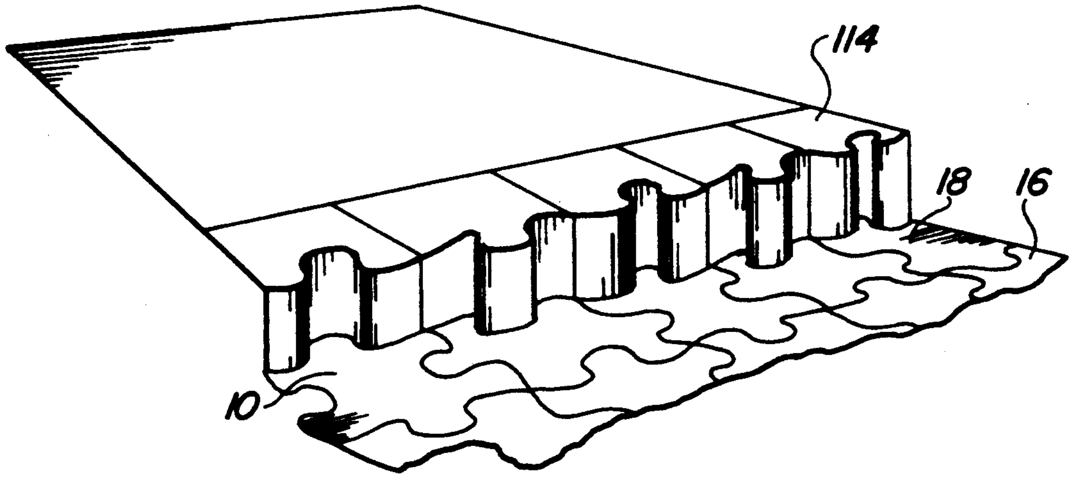

In FIG. 6, a retaining wall 114 is shown as configured with knobs and sockets to meet those of a pattern including elements 10, 16 and 18. The wall as shown is made up of separate blocks but could be poured, for example, as a continuous member.

It will be seen from the foregoing that a simple basic arrangement of interlocking elements has been provided from which many types of patterns may be developed, bearing in mind that the suggested structures are only representative. Other structures, by way of example and not by way of limitation, could be low garden walls, walkways, foyers, entries and so forth. The thickness of the elements could be varied according to the end structure desired and various types of materials and construction processes could be resorted to, as well as variation in colors, texture, etc., among the elements. The elements could be designed so that the end result could embody symbols, initials and the like. These and other alterations and modifications in the preferred embodiments disclosed will occur to those versed in the art, all without departure from the spirit and scope of the invention.

We claim:

1. An assemblage of a plurality of substantially flat construction elements of uniform thickness and having outer flat surfaces and arranged with said surfaces essentially coplanar for the construction of floors, walls and patios, said elements including a base area made up of a first group of identical elements, each having a perimetrical outline configured to provide at least one knob and one socket wherein the knobs and sockets throughout are congruent and interfit knob-to-socket fashion to provide positive interlocks among the elements and the outlines of the elements apart from the knobs and sockets being so shaped as to closely mate with neighboring elements in edge-to-edge fashion, a second group of elements bordering on the first group and having shapes different from those of the first group and including knobs and sockets adapted to interfit among each other as well as with those of the first group, and a third group of elements bordering on the second group and having shapes different from those of the first and second groups and including knobs and sockets adapted to interfit among each other as well as with those of the second group.

2. An assemblage according to claim 1, in which at least one element of the third group is configured to form a corner for the assembled groups of elements.

3. An assemblage according to claim 2, in which said corner-forming element has at least a partial arcuate outline.

4. An assemblage according to claim 2, in which said corner-forming element has a pair of straight outer edges meeting at a 90° angle.

5. An assemblage according to claim 1, in which there are four base elements.

6. An assemblage according to claim 1, in which the third group of elements includes a first set of spaced-apart elements of identical shape and a second set of elements of identical shape different from the first set and interspersed among the elements of the first set.

7. An assemblage of a plurality of substantially flat construction elements of uniform thickness and having outer flat surfaces and arranged with said surfaces essentially coplanar for the construction of floors, walls and patios, said elements including a first group of elements of similar shapes and a second group of elements of shapes differing from the elements of the first group and each element of both groups having a perimetrical outline configured to provide at least one knob and one socket wherein the knobs and sockets throughout several elements are congruent and interfit in knob-to-socket fashion from element to element to provide positive interlocks among the elements, and the outlines of the elements apart from the knobs and sockets being further so shaped as to closely mate with neighboring elements in edge-to-edge fashion and thereby enabling assembly of the elements in any of several patterns.

8. An assemblage according to claim 7, in which the elements in the second group have similar shapes as respects each other.

9. An assemblage according to claim 7, in which the shapes of the elements in the second group are different from each other.

10. An assemblage according to claim 7, in which the second group of elements includes some elements of the same shape and some elements of at least another shape.

11. An assemblage of a plurality of substantially flat construction elements of uniform thickness and having outer flat surfaces and arrangeable with said surfaces essentially coplanar for the construction of floors, walls, patios and components thereof, said elements being of various diverse configurations and respectively including mating knobs and sockets to interlock the elements in knob-to-socket fashion in any of a plurality of geometric patterns.

12. An assemblage according to claim 11, in which at least one of the elements has a perimeter including an arcuate portion.

13. An assemblage according to claim 11, in which each of several elements has a perimeter including an arcuate portion.

14. An assemblage according to claim 13 in which the elements having an arcuate portion are arranged in sequence to form a continuous arc.

15. An assemblage according to claim 11, including a border member of greater thickness than the elements and positively interlocking with at least one element.

16. An assemblage according to claim 11, in which at least one element has a through opening.

17. An assemblage according to claim 11, including a plurality of identical base elements grouped about a common center forming a point about which an arc can be drawn to delineate an edge spaced from the base elements and adapted to filled by further elements having knobs and sockets matching those aforesaid.

* * * * *